United States Patent [19]

Kirkham

[11] 4,359,130
[45] Nov. 16, 1982

[54] HYDRAULIC SYSTEM FOR RESPONSIVE SPLITTING OF ENGINE POWER

[75] Inventor: Steven C. Kirkham, McHenry, Ill.

[73] Assignee: International Harvester Co., Chicago, Ill.

[21] Appl. No.: 153,119

[22] Filed: May 27, 1980

[51] Int. Cl.³ .............................................. B60K 17/10
[52] U.S. Cl. ..................................... 180/306; 60/428;
60/447; 417/216
[58] Field of Search ................. 180/306; 60/428, 430,
60/447, 450; 417/216, 212

[56] References Cited

U.S. PATENT DOCUMENTS

| | | | |
|---|---|---|---|
| 3,543,508 | 12/1970 | Schwab | 60/428 X |
| 3,962,870 | 6/1976 | Lech | 60/428 |
| 3,963,378 | 6/1976 | McMillan | 417/216 |
| 3,985,472 | 10/1976 | Virtue et al. | 60/428 X |
| 4,203,712 | 5/1980 | Vehara | 60/447 |

FOREIGN PATENT DOCUMENTS 2823559 12/1979 Fed. Rep. of Germany ........ 60/447

*Primary Examiner*—John A. Pekar
*Attorney, Agent, or Firm*—D. K. Sullivan; F. D. AuBuchon

[57] ABSTRACT

A hydraulic system for a vehicle having an engine (10) governed to run within a predetermined speed range; the engine (10) arranged to drive a motive power train (11), a charge pump (14), a variable displacement pump (12) and a fixed displacement pump (15). The variable and fixed pumps (12 and 15) are arranged to supply hydraulic fluid pressure to a work circuit (26). A flow signal is created by passing the output from the charge pump (14) through an orifice (40), which signal is routed to a speed valve (46) which directs fluid to a control ram (78) to reduce the displacement of the pump (15) during a predetermined intermediate portion of said speed range.

4 Claims, 2 Drawing Figures

HYDRAULIC SYSTEM FOR RESPONSIVE SPLITTING OF ENGINE POWER

CROSS-REFERENCE TO RELATED APPLICATIONS

The invention disclosed and claimed herein is related to U.S. patent applications, Ser. No. 153,120 by S. C. Kirkham and R. K. Schantz entitled CONTROL MEANS FOR VARIABLE DISPLACEMENT PUMP and Ser. No. 153,118 by S. C. Kirkham, entitled HYDRAULIC LOGIC CONTROL CIRCUIT FOR VARIABLE DISPLACEMENT PUMP. The referenced applications have a filing date and assignee common with this application.

BACKGROUND AND SUMMARY OF THE INVENTION

It has long been common practice in the farm and construction equipment fields to arrange the engine so that it provides both tractive effort for the vehicle and hydraulic power for operation of hydraulically actuated auxiliary equipment carried on or towed by the vehicle. One of the major problems, particularly with some types of construction equipment, such as loaders for example, has been splitting the power from the engine between the tractive effort load and the hydraulic load. Some operator skill in the operation of the equipment has always been required to properly apportion this splitting of the power. An attempt to ease the demands on the operator is disclosed in U.S. Pat. No. 3,789,943, issued Feb. 5, 1974 to K. W. Kampert and K. E. Houtz, wherein the engine operated with the speed control lever continuously in the maximum position between a governed high idle speed and peak torque speed in response to the load imposed on the engine. The speed of such a "constant throttle" engine is independent of ground speed and a modulated clutch was utilized to control clutch slip and hence ground speed. The engine was sized to handle both the maximum hydraulic load and the maximum tractive effort without stalling. Under such conditions, the response of the hydraulic system is sluggish because flow is reduced and the travel speed of the vehicle is slowed for any given drive train ratio because the engine has been lugged down to a speed that is at or just above stall. While such an arrangement permits operation with less operator judgment and skill required, such judgment and skill are still necessary for maximum productivity.

A power split which is set and invariable does not provide efficient use of the available engine power. In a loader, for example, as the bucket is being filled, the vehicle is driven forward into the material while the boom arms are raised slightly and the bucket is rolled back to "break-out" the load into the bucket. During such a maneuver, the power requirement for tractive effort is high but the hydraulic power requirement is relatively low since hydraulic power is a function of both pressure and flow. While the pressure may be at the maximum permitted within the system, the movements of the bucket and boom are small and relatively slow necessitating a small flow. With an even split between traction and hydraulic load set, e.g. 50% to each, only half of the engine's power would be available for traction with the other half available for the hydraulic load. However, the tractive effort could use more power, while the hydraulic load does not require 50% of the engine's power. Conversely, once the bucket is loaded, the boom arms must be raised rapidly and the bucket simultaneously rolled back to maintain it level as the loader is driven to discharge the load, such as into a truck. The heavy load in the bucket and the speed of movement of the boom arms requires a large flow at a relatively high pressure resulting a large hydraulic power requirement. The tractive effort at such time is, for the most part, only rolling resistance. The engine will not be lugged down by the tractive effort load, and would therefore, be capable of devoting a larger portion of its power capability to the hydraulic load.

It is therefore, an object of this invention to provide a hydraulic system which automatically reduces the hydraulic load in response to the engine being lugged down.

It is also an object of this invention to provide a hydraulic system which is responsive, which minimizes the requirements for operator judgment and skill, and which is efficient in operation.

It is also an object of this invention to provide such an improved hydraulic system for a vehicle having a "constant" throttle engine arrangement and which removes a substantial portion of the hydraulic load from the engine when the engine's speed is above its peak torque speed.

It is a further object of this invention to provide a hydraulic system which is responsive to reductions in the engine speed to reduce the hydraulic load on the engine while maintaining a responsive hydraulic system when required.

It is also an object of this invention to provide a vehicle with an engine driving both the tractive effort power train and a hydraulic load with a means for automatically supplying a larger portion of the engine's power to the power train under certain conditions and to the hydraulic load under other conditions.

These and other objects of the present invention, and many of the attendant advantages thereof, will become more readily apparent upon a perusal of the following description and the accompanying drawings, wherein:

FIG. 1 is a schematic of a hydraulic system according to the present invention; and FIG. 2 is a schematic of another embodiment of the present invention.

DESCRIPTION OF A PREFERRED EMBODIMENT

Figure 1:
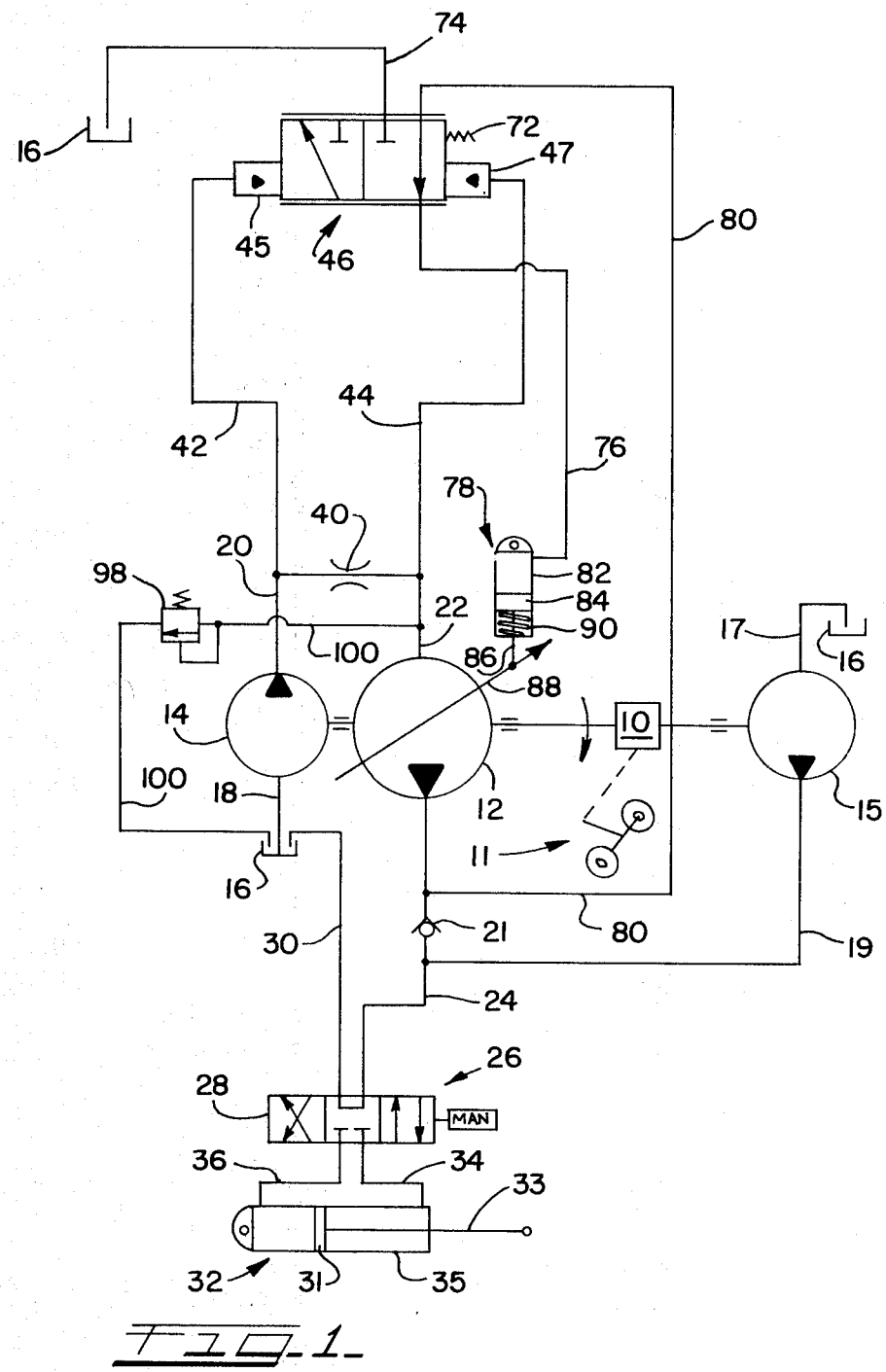

Referring now to FIG. 1, an engine, indicated at 10, is arranged to drive a tractive effort drive train, indicated generally at 11, a variable displacement pump 12, a fixed displacement charge pump 14 and a fixed displacement pump 15. The charge pump 14 draws hydraulic fluid from a reservoir 16 through a suction line 18 and discharges hydraulic fluid under pressure through conduit 20 to the inlet or suction side 22 of variable pump 12. Hydraulic fluid under pressure from the pump 12 is discharged through conduit 24 to a hydraulic work circuit, indicated generally at 26, for hydraulically actuated equipment, such as a boom and bucket conventionally provided on a wheeled loader, for example.

The work circuit 26 is also supplied with hydraulic fluid under pressure by the fixed displacement pump 15 which draws fluid from reservoir 16 through conduit 17 and discharges fluid under pressure into conduit 24 through conduit 19. A check valve 21, located in conduit 24 between its connection with conduit 19 and the pump 12, permits flow only from the pump 12 toward the valve 28, and thereby serves to isolate the fixed pump 15 from the variable pump 12 and its control circuit. The work circuit 26 is exemplified by an open-center, directional control valve 28 connected to conduit 24 with a return conduit 30 connecting the valve 28 to the reservoir 16. A hydraulic ram 32, having a piston 31 and affixed rod 33 reciprocable in a cylinder 35, has its rod end connected by a conduit 34 to the valve 28 and its head end connected thereto by conduit 36. Shifting the spool of valve 28 to the right from its center neutral position, as shown in FIG. 1, will connect pressure conduit 24 with conduit 34 while connecting conduit 36 to return conduit 30 causing the piston 31 to be moved to the left, contracting the ram 12. Similarly, shifting the spool of valve 28 to the left will interconnect conduit 24 with conduit 36 and conduit 36 with conduit 30 causing the ram 32 to be extended.

A fixed orifice 40 is positioned in discharge conduit 20 with a pilot conduit 42 connected therein upstream of the orifice 40 and a similar pilot conduit 44 downstream. The pilot conduits 42 and 44 connect with the actuators 45 and 47 respectively, which actuators are associated with an engine speed responsive valve, indicated generally at 46. The valve 46 has a two-position spool which is urged toward the left, as viewed in FIG. 1, by the spring 72. A conduit 74 connects the valve 46 with the reservoir 16, while conduit 76 connects the valve 46 with a control ram 78. A conduit 80 connects the valve 46 with the discharge conduit 24 upstream of the check valve 21. In the position shown in FIG. 1, the valve 46 connects the conduits 76 and 80 while blocking conduit 74. When the spool of valve 46 is shifted to the right, the conduit 80 is blocked and the conduits 76 and 74 are interconnected. The force of actuator 47 combines with the force of spring 72 to oppose the force of actuator 45. When the force of actuator 45 exceeds those combined forces, the valve 46 will be shifted to the right.

The control ram 78 has a cylinder 82 with a piston 84 and its affixed rod 86 reciprocable therein. The rod 86 is pivotally attached to the movable member 88, such as a swash plate, for example, of the variable pump 12 provided to change the displacement thereof. A compression spring 90 trapped within the cylinder 82 between the piston 84 and the rod end of the cylinder 82 urges the piston 84 toward the head end of the cylinder to thereby move the member 88 in a direction to increase the displacement of the pump 12.

When the engine 10 is operating at a high speed, the charge pump 14 will have a relatively large output which will flow through the orifice 40. The flow through the orifice 40 will create a pressure differential thereacross with the higher pressure being transmitted through pilot conduit 42 to actuator 45 and the lower pressure being transmitted through pilot conduit 44 to actuator 47. The force of actuator 45 will exceed the combined forces of the spring 72 and the force in actuator 47. The spool of valve 46 will be shifted to the right to a position wherein conduit 76 will be connected with the reservoir 16 through conduit 74. The spring 90 will force the piston 84 and its rod 86 to be contracted within the cylinder 82 causing the member 88 to condition the pump 12 for maximum flow. As the speed of engine 10 drops, the flow through the orifice 40 will be reduced and the pressure drop thereacross will also be reduced. At the point where the force of actuator 47 plus the force of the spring 72 under its compressed state just exceeds the force of actuator 45 on the left end of the valve 46, the valve will move toward the left until the reduced spring force due its slight extension has reduced the total force acting on the right end of the valve. Gradual movement of the valve toward the left will continue in proportion to reductions in the engine speed. As the valve 46 moves to the left communication between the conduits 80 and 76 will progressively increase, while simultaneously progressively decreasing communication between the conduits 74 and 76. The pressure within the conduit 76 and hence within the cylinder 82 will progressively increase. As the pressure acting on the top of the piston 84 increases, the piston will move downward compressing the spring 90 and destroking the pump 12, i.e. decreasing its displacement. The downward movement of the piston 84 will, at each stage, be only that amount which will increase the force exerted by the additional compression of spring 90 to equal the increased pressure in the cylinder 82. Once the destroking begins a smooth transition is effected from full displacement to zero displacement.

Since the charge pump 14 is not directly involved in the work circuit 26, the flow therefrom will be related only to the speed of the engine 10. In order to assure a continuous flow of fluid through the orifice 40, even when the pump 12 is at its minimum displacement, a pressure relief valve 98 is positioned in a conduit 100 connected between the conduit 22 and the reservoir 16. The relief valve 98 is set to open at a pressure, e.g. 165 psi, which is relatively low but sufficient to provide charge pressure to the variable displacement pump 12.

Figure 2:
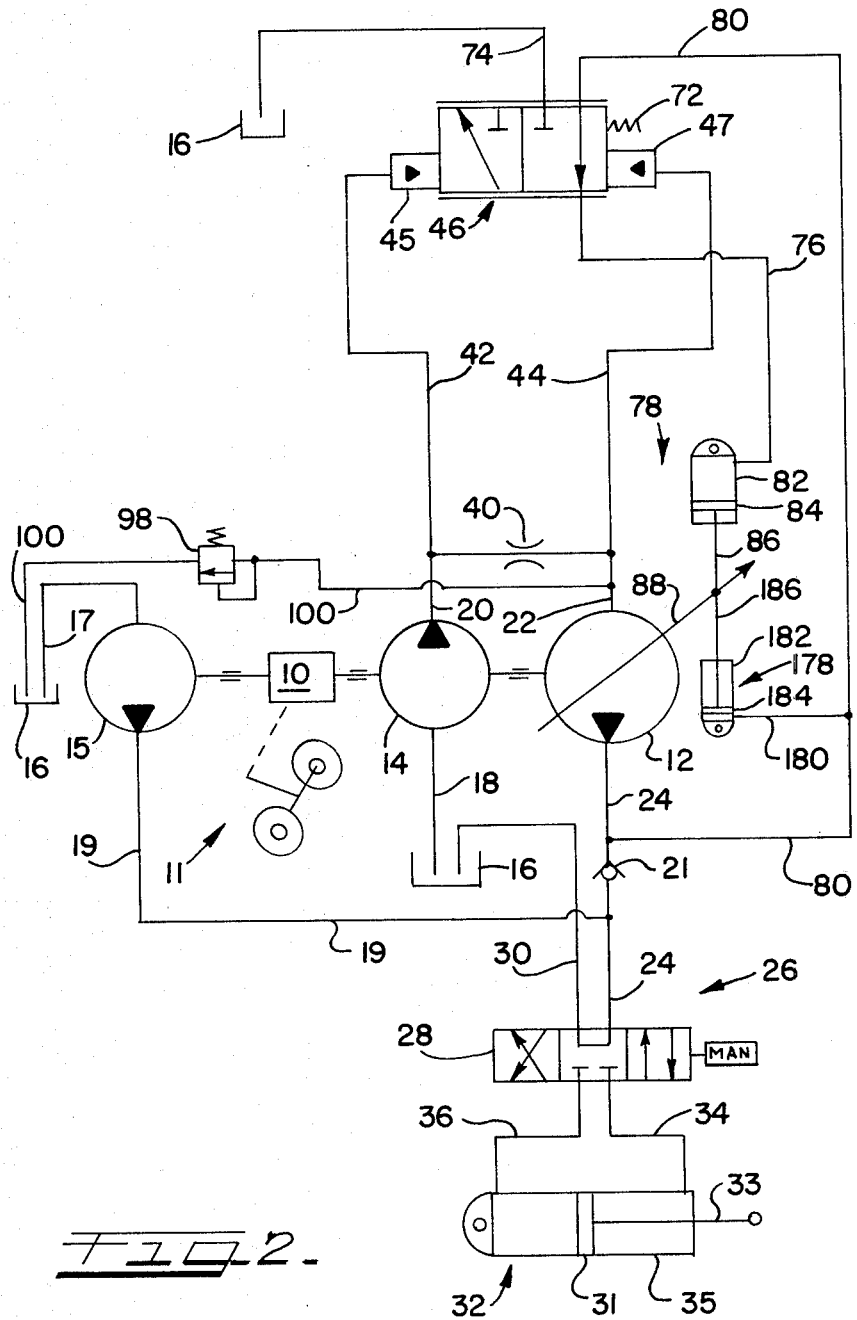

The embodiment of FIG. 2 is similar to that of FIG. 1, with common elements having the same reference characters. The control of the moveable member 88 for determining the displacement of the variable pump 12 is the only substantial difference between the two embodiments but it changes the transition mentioned above to almost vertical. In effect, the FIG. 2 embodiment provides an on-off system for the variable pump.

In FIG. 2, the control ram 78 is not provided with a trapped spring to urge the ram 78 to a contracted position. Instead, a second ram 178 having a cylinder 182 with a piston 184 and its affixed rod 186 reciprocable within the cylinder 182 is substituted for the spring 90 in the embodiment of FIG. 1. The rod 186 is pivotally attached to the moveable member 88 and a conduit 180 connects the conduit 80 with the head end of the ram 178. The diameter of the cylinder 182 is less than the diameter of cylinder 82 so that with equal pressure in both cylinders the force exerted on member 88 by the piston 82 is greater than the force exerted on member 88 by the piston 182. Hence, with the valve 46 in the position shown in FIG. 2, the ram 78 will be extended and the ram 178 retracted and the moveable member thereby moved to condition the pump 12 for minimum displacement. However, when the valve 46 is shifted to the right, the conduit 76 will be connected to reservoir 16 and the pressure communicated to the ram 178 will cause the member 88 to condition the pump 12 for maximum displacement.

Contrasting the two embodiments, it is sometimes preferable that the transition between full and zero displacement and vice versa, be gradual and carried out over a speed range of 100–200 rpms. This is accomplished in the FIG. 1 embodiment by making the valve 46 of the metering type, i.e. it meters between the conduits 74, 76 and 80 as it moves between its extreme positions as described previously and by use of the spring 90 to oppose the pressure tone in the cylinder 82. The spool of valve 46 may be either metering type or not in the on-off system of FIG. 2. A metering type will tend to smooth out the transition a little more because it permits the friction in the system and the inertia of the components to slow the change in displacement. In any case, it is important for the pump 12 to be fully destroked at an engine speed which is slightly higher than the speed at which the engine 10 develops its peak torque. A desirable transition or ramp in the pressure curve is described in connection with FIGS. 2 and 3 of the first-listed referenced application.

The hydraulic system disclosed and claimed herein is ideally suited for a vehicle with a "constant" throttle engine and a modulated clutch such as that disclosed in U.S. Pat. No. 3,789,943, and the disclosure thereof is specifically incorporated herein by reference.

While one embodiment of the present invention has been disclosed, it is to be understood that various changes and modifications may be made therein without departing from the spirit of the invention as defined by the scope of the appended claims.

What is claimed is:

1. A hydraulic system for a vehicle having an engine developing peak torque at a given speed, the engine arranged to power a motive drive train, a first fixed displacement pump, a variable displacement pump and a charge pump disposed to supply the entire fluid requirement of said variable displacement pump, comprising:

an orifice positioned between said charge pump and said variable displacement pump, said orifice accepting substantially the entire discharge from said charge pump;

control ram means operatively connected to said variable displacement pump to vary the displacement of said variable pump upon the application of fluid pressure to said control ram means;

a conduit extending from the output of one of said fixed and variable displacement pumps to said control ram means;

a speed valve disposed in said conduit, said speed valve being operatively associated with said orifice to shift between positions providing full flow and no flow in said conduit in response to the pressure drop across said orifice, the position of said speed valve being independent of the output pressure of said variable displacement pump;

said hydraulic system being disposed to condition said variable pump for minimum displacement when said engine speed is below said given speed and for conditioning said variable pump for maximum displacement when said engine speed is above said given speed.

2. The invention in accordance with claim 1 and said speed valve including a metering spool, said hydraulic system being configured to provide a gradual transition between maximum and minimum displacement of said variable displacement pump.

3. The invention in accordance with claim 2 and said control ram means comprising a single ram disposed to act against a spring to move said variable displacement pump to the minimum displacement position.

4. The invention in accordance with claim 1 and said hydraulic system being configured to effect a sudden transition between pump displacement extremes.

* * * * *